US009993819B2

(12) United States Patent
Alessi et al.

(10) Patent No.: US 9,993,819 B2
(45) Date of Patent: Jun. 12, 2018

(54) APPARATUS FOR ACTUATING AND READING A CENTRIFUGAL MICROFLUIDIC DISK FOR BIOLOGICAL AND BIOCHEMICAL ANALYSES, AND USE OF THE APPARATUS

(71) Applicant: STMicroelectronics S.R.L., Agrate Brianza (IT)

(72) Inventors: Enrico Rosario Alessi, Catania (IT); Floriana San Biagio, Catania (IT); Salvatore Abbisso, Augusta (IT); Salvatore Oliveri, Aci Catena (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 128 days.

(21) Appl. No.: 14/847,915

(22) Filed: Sep. 8, 2015

(65) Prior Publication Data

US 2016/0184825 A1 Jun. 30, 2016

(30) Foreign Application Priority Data

Dec. 30, 2014 (IT) .............................. TO2014A1120

(51) Int. Cl.
*B01L 3/00* (2006.01)
*G01N 21/00* (2006.01)
*B01L 7/00* (2006.01)

(52) U.S. Cl.
CPC ... *B01L 3/502753* (2013.01); *B01L 3/502715* (2013.01); *B01L 7/52* (2013.01);
(Continued)

(58) Field of Classification Search
CPC .................................. B01L 3/00; G01N 21/00
USPC ........ 422/68.1, 502, 503, 504, 50, 401, 402, 422/403, 63, 64, 547, 548, 554, 560, 561, 422/565, 566; 436/43, 174, 180
See application file for complete search history.

(56) References Cited

U.S. PATENT DOCUMENTS 6,852,851 B1 2/2005 Tooke et al.
6,884,395 B2 4/2005 Tooke et al.
(Continued)

FOREIGN PATENT DOCUMENTS

DE 10 2008 003 979 B3 6/2009
DE 10 2010 041 621 A1 3/2012
(Continued)

OTHER PUBLICATIONS

Focke et al., "Centrifugal microfluidic system for primary amplification and secondary real-time PCR," *Lab Chip* 10:3210-3212, 2010.

(Continued)

*Primary Examiner* — Brian J. Sines
(74) *Attorney, Agent, or Firm* — Seed IP Law Group LLP

(57) ABSTRACT

An apparatus for actuating in rotation and reading a centrifugal microfluidic disk for biological and/or biochemical analyses, comprising: a container body, defining an internal chamber forming a closed curvilinear path, the path comprising a housing region configured to house the centrifugal microfluidic disk, and a curvilinear channel fluidically coupled to the housing region; a heater operatively arranged in a section of the curvilinear channel; and a fan operatively arranged in a respective section of the curvilinear channel.

20 Claims, 5 Drawing Sheets

(52) U.S. Cl.
CPC . *B01L 2200/028* (2013.01); *B01L 2200/0668* (2013.01); *B01L 2200/10* (2013.01); *B01L 2200/147* (2013.01); *B01L 2300/0663* (2013.01); *B01L 2300/0803* (2013.01); *B01L 2300/0806* (2013.01); *B01L 2300/1805* (2013.01); *B01L 2300/1827* (2013.01); *B01L 2300/1844* (2013.01); *B01L 2400/043* (2013.01); *B01L 2400/0409* (2013.01)

(56) References Cited

U.S. PATENT DOCUMENTS

| | | | |
|---|---|---|---|
| 6,990,290 B2 | 1/2006 | Kylberg et al. | |
| 7,935,319 B2 | 5/2011 | Andersson et al. | |
| 7,947,235 B2 | 5/2011 | Andersson et al. | |
| 7,951,332 B2 | 5/2011 | Cho et al. | |
| 8,101,138 B2 | 1/2012 | Lee et al. | |
| 8,191,715 B2 | 6/2012 | Cho et al. | |
| 2003/0146155 A1 | 8/2003 | Tooke et al. | |
| 2004/0131345 A1 | 7/2004 | Kylberg et al. | |
| 2005/0277195 A1 | 12/2005 | Holmquist et al. | |
| 2006/0073584 A1 | 4/2006 | Sasaki et al. | |
| 2008/0035579 A1 | 2/2008 | Lee et al. | |
| 2008/0056063 A1 | 3/2008 | Cho et al. | |
| 2008/0101993 A1 | 5/2008 | Andersson et al. | |
| 2008/0108120 A1 | 5/2008 | Cho et al. | |
| 2008/0193336 A1 | 8/2008 | Cho et al. | |
| 2008/0226501 A1 | 9/2008 | Andersson et al. | |
| 2008/0237151 A1 | 10/2008 | Cho et al. | |
| 2009/0003105 A1 | 1/2009 | Itoh et al. | |
| 2009/0022625 A1* | 1/2009 | Lee | B01L 7/52 422/68.1 |
| 2009/0035847 A1* | 2/2009 | Cho | B01F 11/0002 435/289.1 |
| 2009/0143250 A1 | 6/2009 | Lee et al. | |
| 2009/0181412 A1 | 7/2009 | Cho et al. | |
| 2009/0286327 A1 | 11/2009 | Cho et al. | |
| 2010/0307595 A1 | 12/2010 | Mark et al. | |
| 2011/0111987 A1 | 5/2011 | Siegrist et al. | |
| 2011/0124049 A1* | 5/2011 | Li | C12N 15/1093 435/91.2 |
| 2012/0028851 A1 | 2/2012 | Lee et al. | |
| 2013/0344496 A1* | 12/2013 | Peytavi | G01N 21/07 435/6.12 |
| 2014/0199776 A1* | 7/2014 | Kim | B01L 3/502707 436/165 |
| 2015/0233916 A1* | 8/2015 | Melanson | G01N 33/56911 435/7.1 |
| 2015/0244932 A1* | 8/2015 | Kang | B01L 3/502738 348/135 |

FOREIGN PATENT DOCUMENTS

| | | | |
|---|---|---|---|
| DE | 10 2011 083 920 A1 | 4/2013 |
| EP | 2 107 125 A1 | 10/2009 |
| GB | 2 456 410 A | 7/2009 |
| WO | 99/55827 A1 | 11/1999 |
| WO | 00/25921 A1 | 5/2000 |
| WO | 00/40750 A1 | 7/2000 |
| WO | 00/56808 A2 | 9/2000 |
| WO | 00/56808 A3 | 9/2000 |
| WO | 00/58245 A1 | 10/2000 |
| WO | 00/62042 A1 | 10/2000 |
| WO | 01/02737 A1 | 1/2001 |
| WO | 01/46465 A2 | 6/2001 |
| WO | 01/46465 A3 | 6/2001 |
| WO | 01/47637 A1 | 7/2001 |
| WO | 01/47638 A2 | 7/2001 |
| WO | 01/47638 A3 | 7/2001 |
| WO | 01/54810 A1 | 8/2001 |
| WO | 03/066667 A2 | 8/2003 |
| WO | 2012/041809 A1 | 4/2012 |
| WO | 2013/139970 A1 | 9/2013 |

OTHER PUBLICATIONS

Focke et al., "Centrifugo-Thermopneumatic Liquid Actuation for Microfluidic Genotyping of Nucleic Acids," 15$^{th}$ International Conference on Miniaturized Systems for Chemistry and Life Sciences, Oct. 2-6, 2011, Seattle, WA, pp. 659-662.

Focke et al., "Microstructuring of polymer films for sensitive genotyping by real-time PCR on a centrifugal microfluidic platform," *Lab Chip* 10:2519-2526, 2010.

Gorkin et al., "Centrifugal microfluidics for biomedical applications," *Lab Chip* 10:1758-1773, 2010.

Lutz et al., "Microfluidic lab-on-a-foil for nucleic acid analysis based on isothermal recombinase polymerase amplification (RPA)," *Lab Chip* 10:887-893, 2010.

Strohmeier et al., "Magnetic Bead Based DNA Purification on a Disposable Centrifugal Microfluidic Foil Cartridge," 14$^{th}$ International Conference on Miniaturized Systems for Chemistry and Life Sciences, Oct. 3-7, 2010, Groningen, The Netherlands, pp. 402-405.

Strohmeier et al., "Real-Time PCR Based Food Pathogen Detection on a Centrifugal Microfluidic Foil Disk Including Positive- and No-Template-Controls," 15$^{th}$ International Conference on Miniaturized Systems for Chemistry and Life Sciences, Oct. 2-6, 2011, Seattle, WA, pp. 506-509.

van Oordt et al., "Miniature Stick-Packaging—An Industrial Technology for Pre-Storage and Release of Reagents in Lab-on-a-Chip Systems," 15$^{th}$ International Conference on Miniaturized Systems for Chemistry and Life Sciences, Oct. 2-6, 2011, Seattle, WA, pp. 437-440.

* cited by examiner

APPARATUS FOR ACTUATING AND READING A CENTRIFUGAL MICROFLUIDIC DISK FOR BIOLOGICAL AND BIOCHEMICAL ANALYSES, AND USE OF THE APPARATUS

BACKGROUND

Technical Field

The present disclosure relates to an apparatus for actuating in rotation and reading a centrifugal microfluidic disk in order to carry out biological and/or biochemical analyses, and to the use of the apparatus for implementing a fluidic protocol.

The present disclosure applies to the field of molecular diagnostics, in particular to LabDisk technology of a monolithic or hybrid type, automating functions such as DNA sequencing, purification of nucleic acids, real-time PCR, and DNA micro-arrays for providing in a single solution automatic systems for analysis of nucleic acids (also known as "sample-in answer-out systems").

Description of the Related Art

The centrifugal approach to microfluidics offers a unique mode of integrating handling of the liquids for preparing specimens and the subsequent steps of reaction and detection. The process of integration on a single substrate eliminates the need for a separate and preventive handling of the liquids, using pipettes. The characteristics of centrifugal microfluidic systems are particularly attractive in the sectors of life sciences or in applications of in vitro diagnostics where the volumes to be processed in a same test, for example regarding buffer solutions and specimens, frequently differ from one another by several orders of magnitude, and the properties of the various liquids are at times unknown or markedly divergent when specimens different from one another are considered.

However, the above platform has so far encountered little commercial success, as evidenced in the paper by Gorkin R et al., "Centrifugal Microfluidics for Biomedical Applications", Lab on a Chip, 2010, which presents a treatment of centrifugal microfluidic platforms, highlighting the recent progress in the field and possible future applications.

The major features of disk technology of a hybrid or monolithic type are described in what follows. It is first of all a closed system, presenting ports for inlet and outlet of the specimens, and possibly ventilation ports. Thin disks for containing the liquids are used in order to guarantee a good transfer of heat between the chamber in which the disk is housed and the liquids housed in portions of the disk. The liquids are conveyed into selective locations of the disk by a centrifugal force applied to the disk itself. The processes of cellular lysis, DNA purification, real-time PCR, and other biological reactions take place in wells or chambers of plastic material.

Available in the prior art are numerous disks to be used for centrifugal microfluidics in biological applications. See, for example, the paper by Oliver Strohmeier et al., "Real-Time PCR Based Food Pathogen Detection on a Centrifugal Microfluidic Foil Disk Including Positive- and No-Template-Controls", 15th International Conference on Miniaturized Systems for Chemistry and Life Sciences, Oct. 2-6, 2011, Seattle, Wash., USA, pp. 506-508.

See, likewise, the paper by M. Focke et al., "Centrifugo-Thermopneumatic Liquid Actuation for Microfluidic Genotyping of Nucleic Acids", 15th International Conference on Miniaturized Systems for Chemistry and Life Sciences, Oct. 2-6, 2011, Seattle, Wash., USA, pp. 659-661.

See, likewise, the paper by Sascha Lutz et al., "Microfluidic Lab-On-A-Foil for Nucleic Acid Analysis Based on Isothermal Recombinase Polymerase Amplification (RPA)", Lab on a Chip, 2010, vol. 10, pp. 887-893.

Furthermore, known in the literature are the so-called "miniature stick-packs", which have a tubular shape and contain reagents in liquid or dry form, to be used in microfluidic disks of a known type. These packs are configured in such a way that they open, releasing the reagents into a reaction chamber of the microfluidic disk, at a precise speed of rotation, or else at a predefined pressure exerted by the reagents that they contain on a seal of the packs themselves. For this purpose, see, for example, the paper by Thomas van Oordt et al., "Miniature Stick-Packaging—An Industrial Technology for Pre-Storage and Release of Reagents in Lab-On-A-Chip Systems", 15th International Conference on Miniaturized Systems for Chemistry and Life Sciences, Oct. 2-6, 2011, Seattle, Wash., USA, pp. 437-439.

As regards further information on microfluidic disks, and an indication on a method for their manufacture, see, for example, the paper by Maximilian Focke et al., "Microstructuring of Polymer Films for Genotyping by Real-Time PCR on a Centrifugal Microfluidic Platform", Lab on a Chip, 2010, vol. 10, pp. 2519-2526.

However, the instruments used for carrying out the biological processes using the aforesaid disks show some deficiencies. In particular, the control of temperature within the chamber in which the reactions occur is not optimal in terms of regulation of the temperature and ascending and descending ramps (for example, 0.5° C./s), and the read optics does not enable an adequate sensitivity and spatial resolution to be achieved.

BRIEF SUMMARY

The aim of the present disclosure is to provide an apparatus for actuating in rotation and reading a centrifugal microfluidic disk for biological and/or biochemical analyses, and its corresponding use, that will enable the limitations of the prior art to be overcome and in particular that will allow optimization of the control of temperature of the disk (ascending and descending ramps of 3-5° C./s) and of optical reading in the case both of monolithic disks and of silicon-plastic hybrid disks during biological and/or biochemical analyses.

According to the present disclosure, an apparatus for actuating in rotation a centrifugal microfluidic disk for biological and/or biochemical analyses and its corresponding use, are provided.

BRIEF DESCRIPTION OF THE SEVERAL VIEWS OF THE DRAWINGS

For a better understanding of the disclosure, there will be now described some embodiments thereof, purely by way of non-limiting example and with reference to the attached drawings, in which.

DETAILED DESCRIPTION

Figure 1:
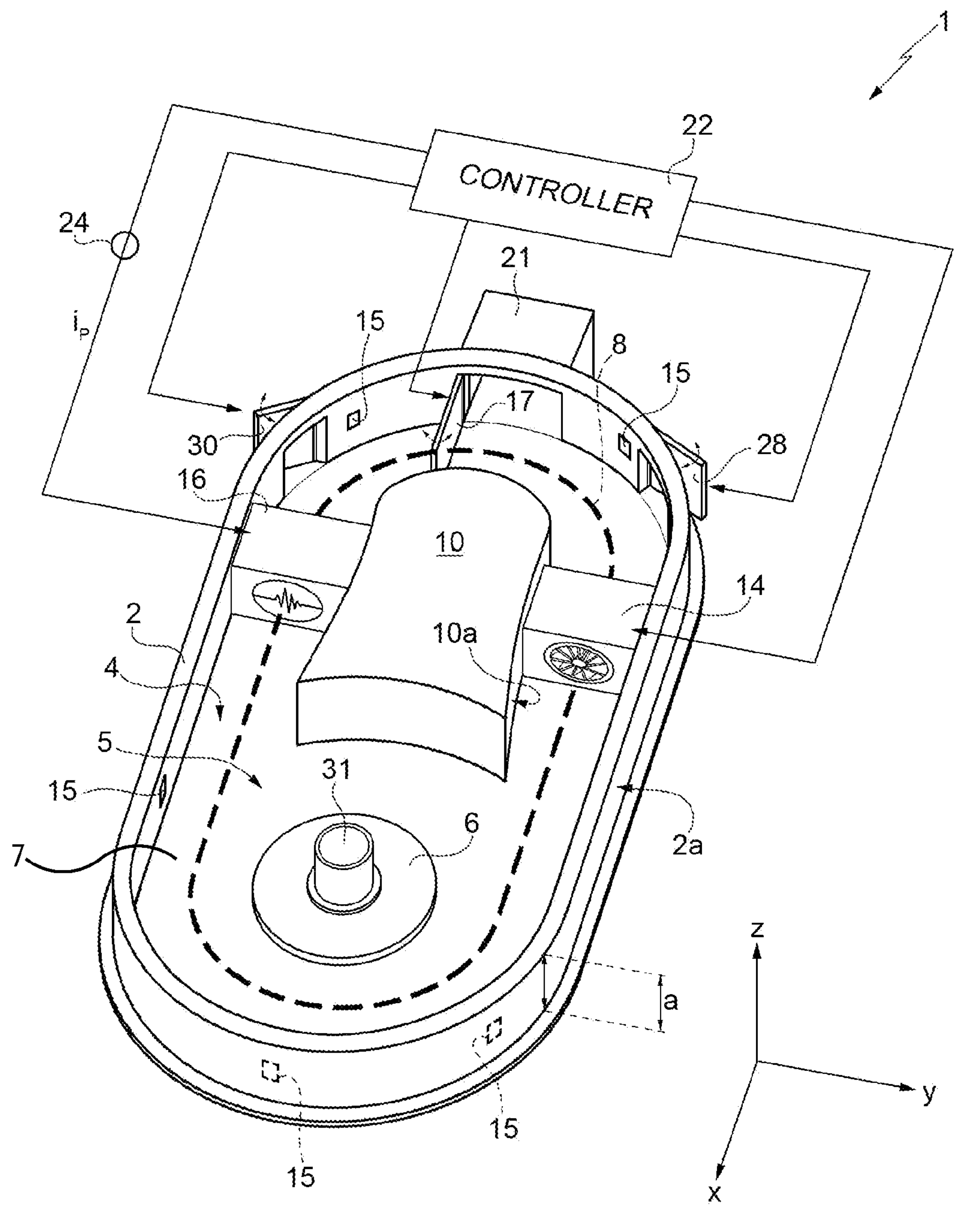
FIG. 1 is a top perspective view of an internal portion of an apparatus for actuating in rotation a centrifugal microfluidic disk according to one aspect of the present disclosure.

FIG. 1 shows, from above and in perspective view, a portion of an apparatus for actuating in rotation a centrifugal microfluidic disk for biological and/or biochemical analyses. In what follows, the aforesaid apparatus will be referred to as "instrument" and will be designated as a whole by the reference number 1. The instrument 1 may be used for carrying out biological processes with centrifugal microfluidic disks of a known type.

As has been said, microfluidic disks for carrying out the biological processes with centrifugal methods are known in the literature. The movement of the fluids (reagents, specimens, and other liquid components) is controlled by the centripetal acceleration (positive: acceleration; or negative: deceleration) generated by rotation of the disk, and by the selective activation of valves that control the connections provided in the disk. The order of magnitude of the centripetal acceleration for correct flow of the liquid, at a rate and at a pressure appropriate for a particular application, are determined by various factors including, but not limited to, the effective radius of the disk, the spatial location of the chambers provided in the disk with respect to the direction of rotation, and the speed of rotation.

Chemical and/or biochemical reactions are carried out in reaction chambers present on the disk, as a function, for example, of capillary forces (i.e., providing capillary valves) and centripetal forces that act on the fluid present in the disk itself. The contents of the reservoirs of reagents, connected to reaction chambers via micro-channels, is thus supplied to the reaction chambers during rotation of the microfluidic disk. The amount of reagents supplied to the chambers is, in particular, a function of the speed of rotation and of the size of the channels that connect the chambers to one another.

The microfluidic disk is typically transparent, or includes transparent regions at the chambers in which the reactions of interest occur. In this way, the optical analysis of a result of the reaction (e.g., fluorescence analysis), may be carried out using an optical module arranged indifferently facing a top side or a bottom side (opposite one another along an axis Z) of the microfluidic disk.

The microfluidic disk has a circular shape, with a diameter comprised between 1 cm and 30 cm, in particular 13 cm, and a thickness of from some tens of micrometers up to some hundreds of micrometers (e.g., 200 μm).

Known in the prior art are microfluidic disks of a monolithic type, in which all the reactions occur in chambers provided in the disk itself, and hybrid disks, which house, for example, a microfluidic chip, for instance of plastic material. The microfluidic chip comprises a plurality of wells, each of which is connected to one or more chambers of the disk via respective channels. In this case, some of the reactions take place in the chambers inside the disk and some in the wells of the microfluidic chip.

The instrument 1, in the view of FIG. 1 in a reference system with three axes X, Y and Z, is provided with a containment body 2 defining an internal chamber 4. In a way not illustrated in FIG. 1 (but shown in FIG. 6), the containment body 2 further includes a cover 3, designed to seal the chamber 4 at the top during use. The containment body 2 is delimited by side walls 2*a*, having a thickness a, along the axis Z, for example of some centimeters. The chamber 4 is operatively divided into a region 5, designed to house a centrifugal microfluidic disk (the disk is designated in FIG. 6 by the reference 51), and into a curvilinear path 8, which is for example oval, which includes the region 5. In particular, the region 5 houses a supporting platform 6 for the microfluidic disk, provided with a rotary member, or spindle 31, on which the disk is fitted (in a way substantially similar to what occurs for a CD-ROM reader).

In order to delimit the path 8, the chamber 4 houses a central island region 10, having a side wall 10*a*. The central island region 10 has a thickness, along Z, equal to a. The path 8 is thus delimited between the wall 2*a* of the containment body 2 and the side wall 10*a* of the central island 10.

Figure 2:
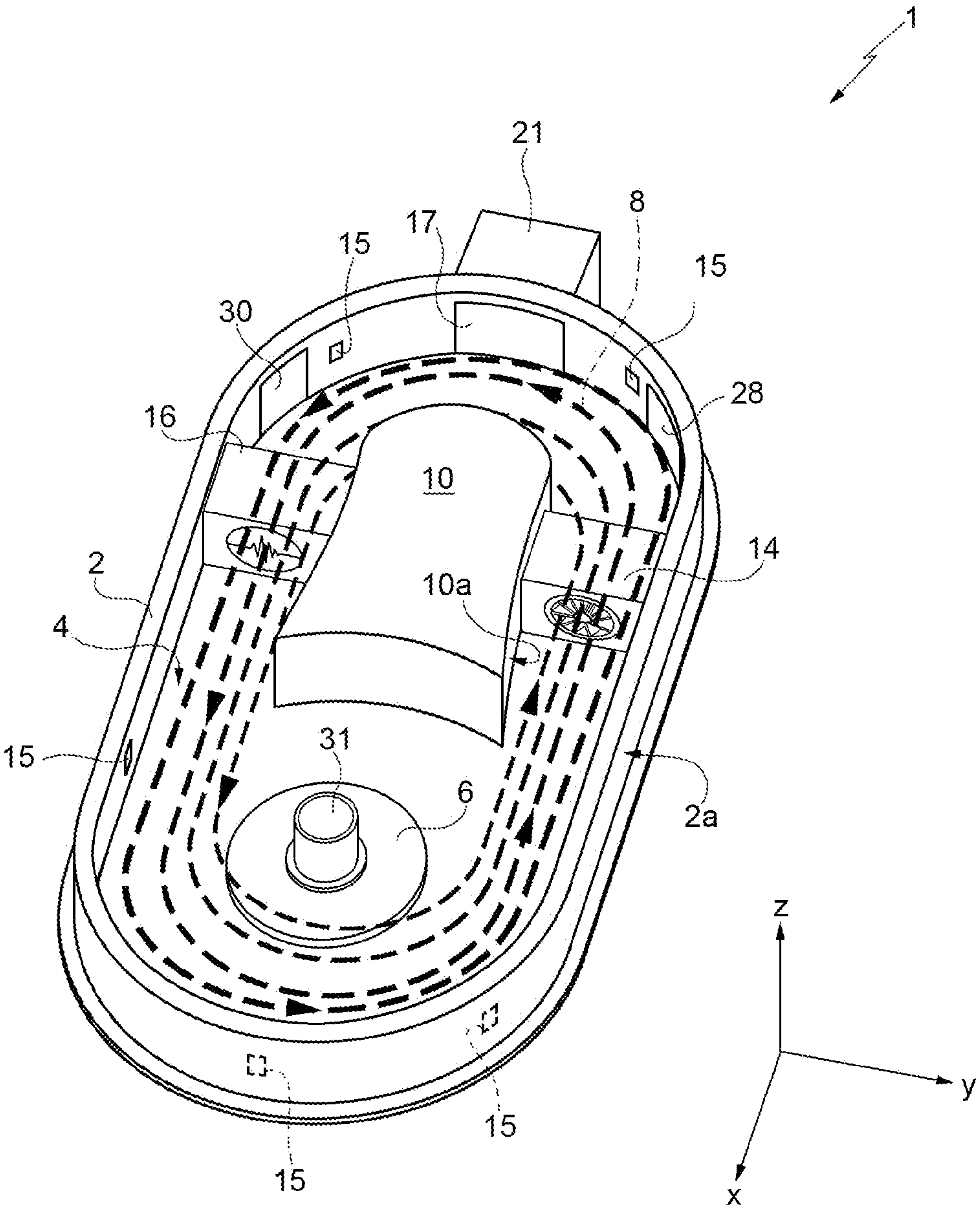
FIG. 2 shows the path of the air within the apparatus of FIG. 1, during use.

When the cover 3 of the chamber 4 is arranged on the chamber 4 in contact with the side wall 2*a* of the containment body 2 for sealing it, the path 8 is a closed path followed by a gaseous fluid (in particular, air) that flows in the chamber 4 (see FIG. 2 that shows lines of flow of air within the path 8).

The chamber 4 further houses, in respective sections of the path 8, a fan 14 and a heater 16. In particular, the fan 14 and the heater 16 are arranged along the path 8, between the side wall 2*a* of the containment body 2 and the side wall 10*a* of the central island 10. Once again in greater detail, the fan 14 and the heater 16 are arranged on opposite sides, in the direction of the axis Y, of the central island 10. During a biological reaction that occurs a specific temperature, concomitant activation of the heater 16 and of the fan 14 enable said temperature to be reached in a uniform way in the region 5, efficiently and rapidly. In particular, microfluidic disks of a known type envisage providing the reaction chambers in peripheral portions of the disk itself. The modalities of circulation of the air in the chamber 4 are such that, in particular in the region 5, the flow of air is directed in a uniform way in said peripheral portions of the microfluidic disk.

FIG. 2 shows the instrument of FIG. 1, illustrated in which are the lines of gaseous flow during operation of the fan 14 (in the presence of a top cover 3 of the chamber 4 to prevent dispersion of heat).

According to one embodiment, the heater 16 is formed by a spiral of resistive material, which, as a function of the current that flows through it, generates heat by the Joule effect. Control of the current supplied to the heater 16 is managed by a controller 22, illustrated schematically in FIG. 1, operatively coupled to a current generator 24, for supplying to the heater 16 pulses $i_P$ of electric current according to a modulation of a PWM (pulse-width modulation) type. The applicant has found that, by supplying the current $i_P$ to the heater 16 according to a pulse-width modulation scheme avoids an overcurrent phenomena, in which the resistors of the heater 16 are overheated, and it is further possible to bring about an increase of the temperature in the chamber 4 in a more controlled way, following more faithfully the biological protocol that is being implemented.

Control of the temperature in the chamber 4 is obtained with the aid of one or more temperature sensors 15 of a known type (illustrated schematically as being coupled to the internal wall of the containment body 2), arranged in the region 5, in the proximity of the microfluidic disk and/or along the path 8. The temperature sensors 15 are operatively coupled to the controller 22, for sending to the latter information on the internal temperature of the chamber 4.

According to a further aspect of the present disclosure, the instrument 1 comprises one or more side openings, made through the wall 2*a* of the containment body 2, which designed to arranged the inside of the chamber 4 in communication with the environment external to the instrument 1. Illustrated, in particular, in FIG. 1 are two openings, or windows, 28, 30, arranged respectively in the proximity of the fan 14 and of the heater 16, in a region of the chamber 4 opposite, along the axis X, to the region 5 that houses the platform 6. The windows 28, 30 may be selectively driven into an open state (thus arranging the chamber 4 in communication with the outside of the instrument 1) and into a closed state (thus insulating the chamber 4 from the outside of the instrument 1). For this purpose, the windows 28 and 30 are, for example, provided with a sliding closing element, which is motor-driven and may be arranged by the controller 22 in the open state (to enable heat exchange with the outside of the instrument 1) and in the closed state (to thermally insulate the inside of the instrument 1 from the outside).

In use, the windows 28, 30 may be used for regulating the temperature within the chamber 4, both during a step of heating of the chamber 4 and during a step of cooling of the chamber 4.

In particular, during the heating step, the windows 28, 30 are simultaneously controlled according to a succession of open-closed states, in particular in the proximity of the point where the maximum operating temperature required for the protocol that is being implemented is reached. In this way, it is possible to prevent phenomena of overtemperature caused by the thermal inertia of cooling of the resistive heater 16. The temperature information, for controlling the windows 28, 30 in sequence in the open and closed states, is supplied by the temperature sensors 15 to the controller 22, and then the controller 22 uses this information to drive the motors that govern actuation of the windows 28, 30 (together with the PWM pulses supplied to the heater 16) until the temperature envisaged is reached.

Instead, during the cooling step, both of the windows 28, 30 are open, the heater 16 is off, and the fan 14 is operating. The exchange of heat and air through the windows 28 and 30 thus enables fast cooling of the chamber 4, bringing it to room temperature.

In order to improve heat exchange with the outside of the instrument 1 during the cooling step, an internal port 17 may be provided (arranged between the window 28 and the window 30, in a region of the chamber 4 opposite, along X, to the region 5 for housing the microfluidic disk), which is designed to interrupt the path 8. In this case, to improve heat exchange and render the cooling operation faster, the internal port 17 is driven into an open state (i.e., interrupting the path 8) during action of the fan 14. The air is thus forced to enter through one of the windows 28/30 and exit through the other window 28/30 (any further internal recirculation is thus prevented). When the desired temperature is reached, the internal port 17 is driven into a closed state, thus freeing the path 8 and enabling the internal recirculation of the air, and likewise closing the windows 28, 30. In order to regulate the exchange of air with the outside of the instrument 1 exclusively by the windows 28, 30, the internal port 17 does not communicate with the outside of the instrument 1, but with an intermediate chamber 21; this does not enable an exchange of air between the inside and the outside of the instrument 1. It is, however, evident that it is possible, according to a different embodiment, not to provide the intermediate chamber 21.

In a way not illustrated in detail but evident to the person skilled in the branch, opening and closing of the internal port 17 may be performed by using an electric motor, controlled by the controller 22, operatively coupled to the internal port 17.

It is evident that, in the case where it is desired simply to lower the temperature by a few degrees during use, it is likewise possible to drive the windows 28, 30 into an open state and the internal port 17 into a closed state, with the fan 14 and the heater 16 operating.

The type of heater 16, as likewise the value of the current $i_P$ supplied thereto, are chosen on the basis of the temperatures that it is desired to reach. According to one embodiment, a heater capable of working between 5° C. and 100° C. above room temperature is used. The ramp of increase/decrease of the temperature may be controlled by PWM, by choosing the width of the pulses and the interval between the pulses in such a way as to obtain an increase of temperature during the heating step comprised between 1° C./s and 5° C./s, and a reduction of temperature during the cooling step comprised between 1° C./s and 5° C./s, chosen on the basis of the biological protocol that is being implemented.

The platform 6 is operatively coupled to a bi-directional electric motor (not visible in detail in FIG. 1, but designated as a whole by the reference 32 in FIG. 3) of a brushless type, arranged underneath the platform 6. This type of motor offers particular advantages in so far as it is particularly efficient given the low mechanical resistance offered during rotation, and low thermal and mechanical losses and electrical dissipation. Control of rotation (speed and direction) of the motor 32 is implemented by a motor control unit integrated, for example, in the controller 22, or in a separate card. The brushless motor 32 is chosen from among commercially available motors, designed to guarantee at least frequencies of rotation comprised between 0 Hz (motor stationary) and 99 Hz, with acceleration and deceleration comprised between 0.5 Hz/s and 50 Hz/s. It is evident that motors that guarantee better performance may be used.

Figure 3:
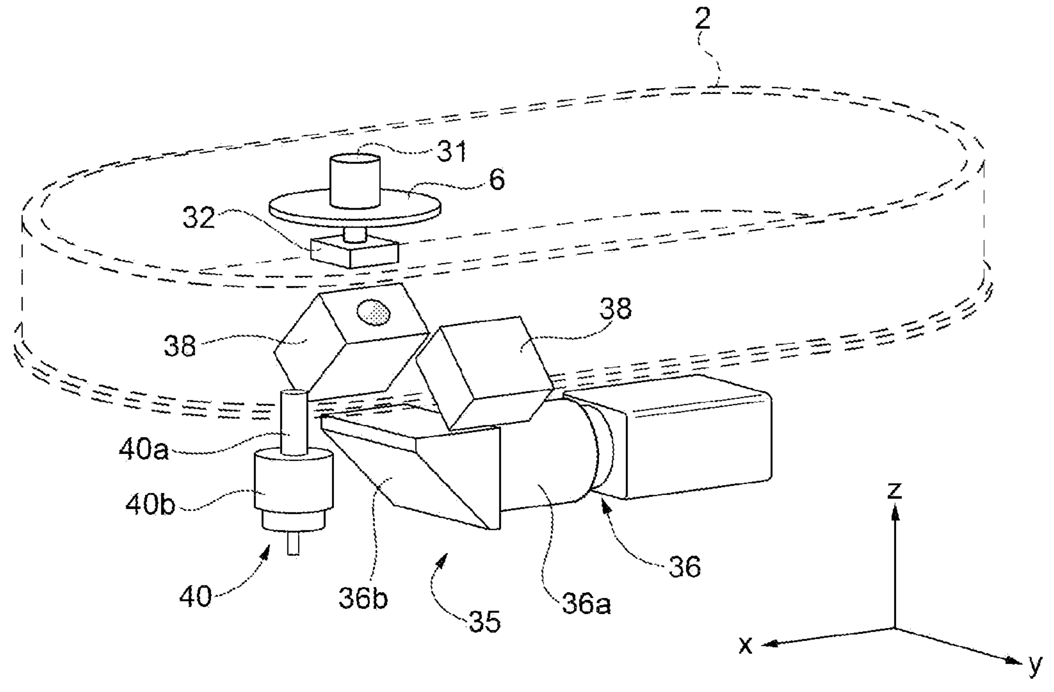
FIG. 3 shows a further perspective view of the apparatus of FIG. 1, from which further elements that form the apparatus of FIG. 1 may be appreciated.

Furthermore, as is more clearly visible in FIG. 3, the instrument 1 comprises an optical module 35, for excitation of fluorophores, or fluorescent markers, during fluorescence tests and for optical reading. The optical module 35 faces the region 5 for illuminating, and reading the radiation emitted by, the microfluidic disk from beneath, i.e., from the side opposite to the side where the microfluidic disk is inserted into the region 5. For this purpose, it is evident that the platform 6, like the microfluidic disk, should be configured in such a way as to enable lighting and optical reading. In particular, the microfluidic disk is of a material transparent to the wavelengths of lighting radiation and the emitted radiation (which depend upon the type of fluorophores or fluorescent markers used). If the microfluidic disk is of a rigid type, the platform 6 has dimensions such as to support it in a central portion thereof, leaving free the regions of the microfluidic disk in which the biochemical reactions being monitored by fluorescence occur. Instead, in the case where the microfluidic disk is not rigid, but for example flexible, the platform 6 has dimensions such as to support it completely so that it does not bend during use. In this case, also the platform 6 is transparent to the wavelengths of lighting radiation and the emitted radiation (for example, it comprises hollow regions).

Figure 4:
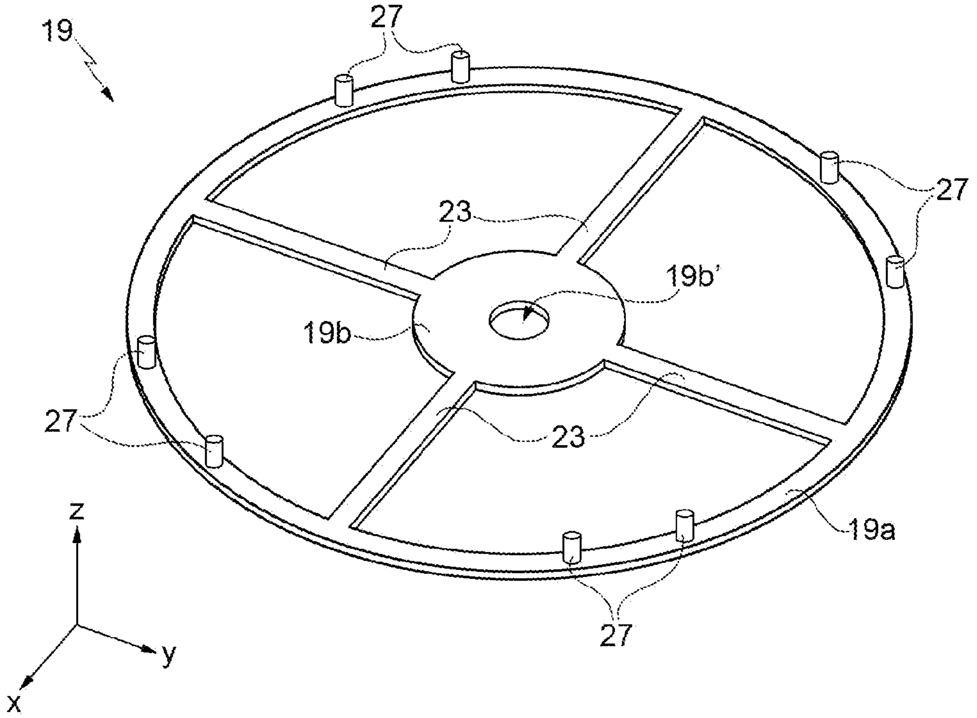
FIG. 4 shows a supporting disk, to be used with the apparatus of FIG. 1.

According to a further embodiment, in the case of a flexible microfluidic disk, it is possible to envisage use of a supporting disk 19, of the type illustrated by way of example in FIG. 4. In this case, the platform 6 has dimensions such as to support the supporting disk 19 in a central portion thereof, and the microfluidic disk is configured in such a way as to rest on the supporting disk 19. In greater detail, the supporting disk 19 has a grid. The grid has an axis Z and is formed by an outer annular region 19*a*, having a small thickness, and a central annular region 19*b*, both of which share the axis Z. The supporting disk 19 comprises a plurality of spokes 23 (e.g., four spokes) evenly distributed about the axis Z, which extend between the central annular region 19*b* and the outer annular region 19*a*. Each pair of spokes 23 defines, together with the outer annular region 19*a* and the central annular region 19*b*, a respective opening 25.

The central annular region 19*b* has a central hole 19*b*', having dimensions such as to couple to the spindle 31 of the instrument 1.

In a way not illustrated in FIG. 4, the supporting disk 19 may optionally comprise one or more further annular regions arranged between the outer annular region 19*a* and the central annular region 19*b*.

The supporting disk 19 further comprises one or more projections 27, which extend along the axis Z starting from one or more from among the outer annular region 19*a*, the central annular region 19*b*, and the spokes 23. Said projections 27 form anchorage points for coupling, in a way fixed with respect to the flexible microfluidic disk, to the supporting disk 19.

In order to enable lighting of the microfluidic disk and acquisition of the radiation emitted by the markers, and at the same time guarantee thermal insulation of the inside of the region 5 (and in general of the path 8), the region 5 of the instrument 1 has a bottom base 7 of a material transparent to the wavelengths of the lighting radiation and the emitted radiation and such as not to alter the value of said wavelengths (for example, glass).

The optical module 35 includes an image-acquisition optical sensor 36, for example based upon a CCD or CMOS sensor, in particular with a resolution of 1392×1040 (but other resolutions may be chosen), operating on 8 bits, and one or more illuminators 38 (two illuminators 38 are illustrated in FIG. 3). The illuminators 38 provide a system of excitation of the reaction chambers of the microfluidic disk and are configured to illuminate selective portions of the microfluidic disk in which the reaction chambers are located. According to the embodiment illustrated in FIG. 3, the illuminators 38 are arranged symmetrically with respect to the axis X, and oriented in a way such that the respective light radiation is directed towards the platform 6, in particular in respective directions forming an angle of approximately 45° with respect to the direction of the axis Z. Each illuminator 38 is provided in LED technology, using 5-mm LEDs, has two focal lengths and an excitation filter, which has the function of filtering all the wavelengths of the light source (the LEDs in this case) except for the range of excitation wavelengths of the fluorophores under examination.

The optical sensor 36 is operatively coupled to a bandpass filter (for example, forming part of a set of filters, automatically interchangeable with one another by a rotary mechanism), configured to separate the wavelengths emitted by the fluorophores from the excitation wavelengths (generated by the illuminators 38). As may be noted from FIG. 3, in order to optimize occupation of space, the optical sensor 36 is formed by a first optical unit 36*a* oriented along the axis X and a second optical unit 36*b* oriented along the axis Z, or in any case configured in such a way as to acquire an image in the plane XY of lie of the microfluidic disk during use. For instance, the second optical unit 36*b* includes a mirror, oriented for receiving the light radiation coming from the microfluidic disk during use (in this example, along Z) and reflecting it in the direction of image acquisition of the first optical unit 36*a* (in this example, along X).

According to one embodiment, the optical sensor 36 is configured to read the fluorescence emitted during a PCR process, in specific chambers of the microfluidic disk, or wells of the microfluidic chip coupled to the microfluidic disk (if this is of a hybrid type).

According to one embodiment, in order to optimize reading of just one chamber at a time (or just one well of the microfluidic chip in the case where hybrid disks are used), preventing any possible undesirable reflections of light (cross talk) deriving from adjacent wells/chambers, the second optical unit 36*b* may be provided in the form of an optical mask, configured to acquire selectively the image of the well/chamber under examination.

The optical mask is applied on the terminal part of the lens (e.g., coupled to the second optical unit 36). According to a embodiment, the optical mask has a shape and dimensions such as to adapt to the lens on which it is applied and has a hole provided in a region of the optical mask, which has dimensions such as to enable the second optical unit 36*b* to acquire only the light radiation emitted by the chamber or a desired portion of the microfluidic disk. The optical mask may be of any non-reflecting material, e.g., plastic.

The optical calibration, as likewise the optical alignment with the disk, may be arranged in the manufacturing stage, in a per se known manner and with the aid of a computer.

For instance, according to one embodiment, the read optical module is configured to read four detection wavelengths (four colors). A first color corresponds to the wavelength emitted by FAM (fluorescein amidite) dyes, for monitoring biochemical reactions using an excitation wavelength of 494 nm, and detecting an emission at 518 nm. A second color corresponds to the wavelength emitted by ROX dyes, for monitoring biochemical reactions using an excitation wavelength of 575 nm, and detecting an emission at 602 nm. A third color corresponds to the wavelength emitted by JOE dyes, for monitoring biochemical reactions using an excitation wavelength of 520 nm, and detecting an emission at 548 nm. A fourth color corresponds to the wavelength emitted by TAMRA dyes, for monitoring biochemical reactions using an excitation wavelength of 555 nm, and detecting an emission at 580 nm.

For instance, the excitation wavelengths of FAM and ROX dyes are emitted by one illuminator 38, whereas the excitation wavelengths of JOE and TAMRA dyes are emitted by the other illuminator 38. The emission wavelengths are detected by the optical sensor 36 using appropriate filters for selecting the emission wavelength of interest, on the basis of the analysis that is being made.

Optical reading is carried out at a specific temperature, for example 35-40° C. However, the reading temperature may vary and depends upon the type of reaction considered (higher reading temperatures are possible). For this purpose, the heating/cooling scheme described previously is particularly advantageous in so far as it enables precise and uniform arranging of the temperature of interest.

It is evident that one or both of the illuminators 38 may be configured to emit a light radiation in other ranges of wavelength, (for example, between 400 and 600 nm, more in particular between 494 and 595 nm), and the optical sensor 36 may be configured (for example, by interposition of appropriate filters) for acquiring light radiation at wavelengths corresponding to the fluorophores or fluorescent markers used (for example, in the range from 500 nm to 700 nm, more in particular from 518 nm to 615 nm).

The instrument 1 further comprises, according to one embodiment, one or more permanent magnets 40*a*, coupled to a linear step motor 40*b*, referred to as a whole as "magnetic actuator 40". The magnets 40*a* are moved by the step motor 40*b* in regions of the microfluidic disk along which possible magnetic beads are to be moved during rotation of the microfluidic disk itself. Magnetic beads, possibly coupled to surface functional groups, may be used, for example, for capturing a predefined target material during a biological process performed in the microfluidic disk.

The instrument 1 is, for example, supplied by the conventional mains supply, at 110/220 Vac, 50/60 Hz (automatic switching), but other forms of supply may be implemented, for example, battery supply.

According to one aspect of the present disclosure, the central island region 10 houses an instrument 33 for actuating and reading a microfluidic chip in the case where hybrid disks are used. In fact, in this case, the hybrid disk that houses the microfluidic chip (e.g., a chip of semiconductor material) can be read by a separate and dedicated reader for reading (e.g., optically) the wells of the microfluidic chip, as well as a module for actuation of the microfluidic chip, in particular including a dedicated heater and/or electrical connections for activating the microfluidic chip in the case where mounted thereon are electrical/electronic elements.

Figure 5:
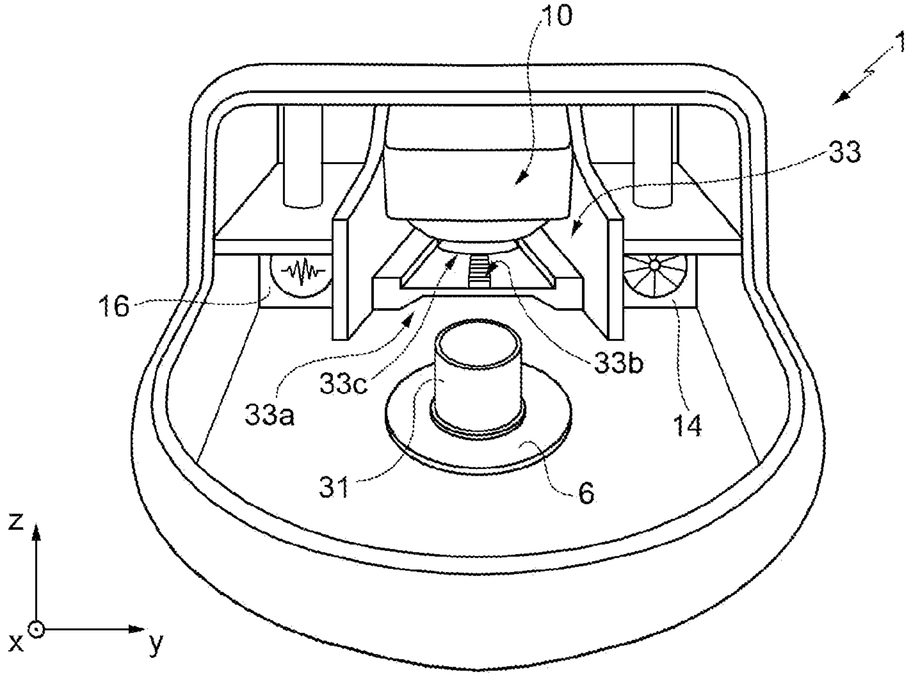
FIG. 5 shows a further front view of the apparatus of FIG. 1, according to one embodiment of the present disclosure.

FIG. 5 shows a front view of the instrument 1, where location of the actuating and reading instrument 33 in the central island region 10 may be noted.

The central island region 10 has a central opening 33*a* in which the microfluidic disk is inserted during rotation. A heater 33*b* is arranged in the central opening 33*a*, underneath the microfluidic disk. An optical reader 33*c* (illuminator and image-acquisition device) is arranged in the central opening 33*a*, on the side opposite to the heater 33*b*, i.e., at the top with respect to the microfluidic disk. In use, for actuating and reading the microfluidic chip, the disk is stopped in such a way that the microfluidic chip is inserted into the opening 33*a*, aligned, along the axis Z, with the heater 33*b* and the optical reader 33*c*. For this purpose, optical alignment elements (or markers), or mechanical alignment elements, may be provided configured in such a way as to enable alignment of the microfluidic chip with the heater 33*b* and the optical reader 33*c*.

Control of the heater 33*b* and of the optical reader 33*c* are managed by the controller 22.

According to a different embodiment, the actuating and reading module 33 is mounted on a rail and is mobile in the direction of the axis X for enabling operative coupling to the microfluidic disk. In other words, the actuating and reading module 33 is mobile between a first operating position, in which it is arranged back with respect to the microfluidic disk, and a second operating position, in which it is electrically and/or optically coupled to the microfluidic chip housed by the microfluidic disk. In this way, it is possible to achieve greater operating flexibility as compared to the embodiment in which the module 33 is fixed, in so far as it enables a good adaptation in the case where hybrid disks that differ from one another as regards dimensions and arrangement of the microfluidic chip are used. Movement between the first and second operating positions is governed by an electric motor, for example a per se known step motor.

In the case where electrical actuation of the microfluidic chip is envisaged, likewise provided is a feedback (closed-loop) control, for example of a type based upon a reading of resistance. This enables verification of the correct set-up of the electrical contact.

The module 33 may further comprise additional elements with respect to what has been described, for control of the microfluidic chip or for optical reading, in order to acquire a result of the reactions carried out in the wells of the microfluidic chip.

Figure 6:
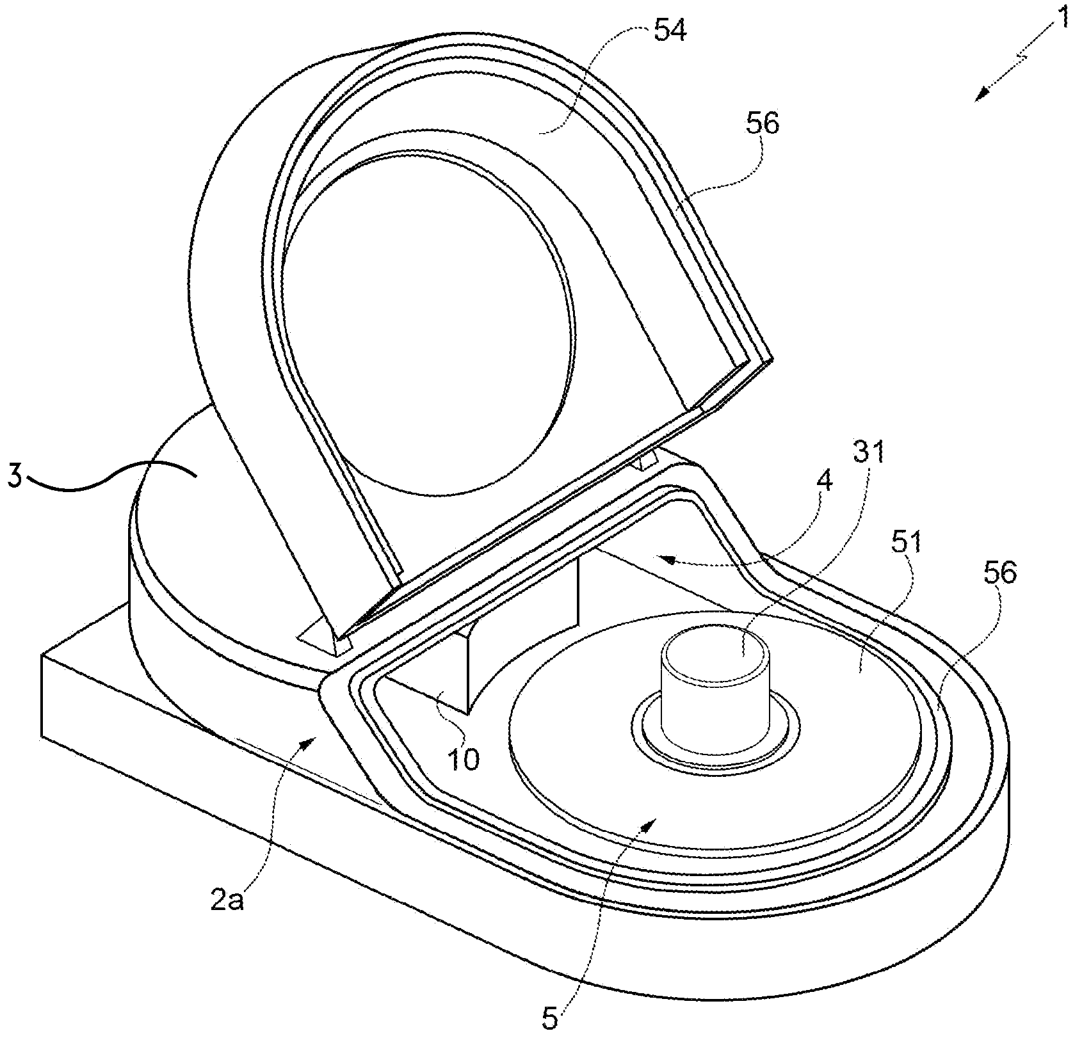
FIG. 6 is a further perspective view of the apparatus of FIG. 1, from which the coating may be appreciated.

FIG. 6 shows the instrument 1 provided with cover 3. In particular, to enable insertion of the microfluidic disk (designated by the reference 51 in FIG. 6), the instrument 1 is provided with an access port 54, which is rotatably connected to the cover 3 and enables access from the top to the region 5 in which the microfluidic disk 51 is to be housed. Opening of the access port 54 is enabled by the presence of one or more hinges on the cover 3 and may be manual or automatic. Closing of the access port 54 is configured in such a way as to guarantee a good thermal insulation of the chamber 4, for example by envisaging use of a guide or a "snap-action" or "push-'n-click" closing mechanism 56.

The instrument 1 described previously may be used for implementing the fluidic protocol described in what follows.

Step 100, metering: (i) charging of the inlet channel of the microfluidic disk, and (ii) metering of the liquid, using the following parameters:

| Step | Starting time [s] | Duration [s] | Freq [Hz] | Accel Hz/s | Temp [° C.] | Sub-step |
|---|---|---|---|---|---|---|
| Meter. (100) | 0 | 2 | 0-10 | 5 | 25 | (i) charging |
| | 2 | 100 | 10-15 | 1/20 | 25 | (ii) metering of the liquid |

Step 102, filling: (i) reduction of the speed of rotation for preventing a premature failure of possible valves present on the disk (in particular, capillary valves); (ii) heating prior to transfer of the liquid to the detection chambers; (iii) failure of the capillary valve and filling of the detection chamber. For this step, the following parameters are used:

| Step | Starting time [s] | Duration [s] | Freq. [Hz] | Accel. Hz/s | Temp [° C.] | Sub-step |
|---|---|---|---|---|---|---|
| Filling (102) | 102 | 2 | 15-5 | 5 | 25 | (i) deceleration |
| | 104 | 150 | 5 | 0 | 25-50 | (ii) heating |
| | 254 | 3 | 5-75 | 20 | 50 | (iii) failure |

Step 104, pre-hydration and pre-PCR reading: (i) cooling, for reading the temperature; (ii) deceleration, for reading the frequency; (iii) pre-PCR reading. For this step, the following parameters are used:

| Step | Starting time [s] | Duration [s] | Freq. [Hz] | Accel. Hz/s] | Temp. [° C.] | Sub-step |
|---|---|---|---|---|---|---|
| pre-hydr. and pre-PCR reading (104) | 257 | 15 | 75 | 0 | 50-35 | (i) cooling |
| | 268 | 14 | 75-5 | −5 | 35 | (ii) deceleration |
| | 158 | 200/10 | 5 | 0 | 35 | (iii) pre-PCR reading |

Step 106, denaturing: (i) acceleration up to the denaturing frequency; (ii) heating for implementing the denaturing sub-step. The sub-step (ii) is repeated cyclically over time. For this step, the following parameters are used:

| Step | Starting time [s] | Duration [s] | Freq. [Hz] | Accel. Hz/s] | Temp. [° C.] | Sub-step |
|---|---|---|---|---|---|---|
| Denaturing (106) | 358 | 4 | 5-75 | 20 | 35 | (i) acceleration |
| | 362 | 60 | 75 | 0 | 35-95 | (ii) heating |

Step 108, temperature annealing: (i) cooling for implementing the annealing sub-step (elongation); (ii) annealing sub-step. The sub-steps (i)-(ii) are thermal cycles repeated over time. The duration of the sub-step (ii) is not specified, in so far as it is chosen as required and on the basis of the particular process that is being carried out. The sub-steps (i) and (ii) are repeated cyclically over time. For this step, the following parameters are used:

| Step | Starting time [s] | Duration [s] | Freq. [Hz] | Accel. Hz/s] | Temp. [° C.] | Sub-step |
|---|---|---|---|---|---|---|
| Annealing (108) | 397 | 35 | 75 | 0 | 95-60 | (i) cooling |
| | | | 75 | 0 | 60 | (ii) annealing |

Step 110, post-PCR reading: (i) cooling down to the reading temperature; (ii) deceleration for reading; (iii) post-PCR reading. For this step, the following parameters are used:

| Step | Starting time [s] | Duration [s] | Freq. [Hz] | Accel. Hz/s] | Temp. [° C.] | Sub-step |
|---|---|---|---|---|---|---|
| Read post-PCR (110) | | 25 | 75 | 0 | 60-35 | (i) cooling |
| | | 14 | 75-5 | −5 | 35 | (ii) deceleration |
| | | 200/10 | 5 | 0 | 35 | (iii) post-PCR reading |

Step 112, extraction: (i) acceleration for generating an appropriate pressure in the disk; (ii) generation of the pressure required for expansion of the air, guaranteeing transfer of the liquids to the collection channels; (iii) charging of a dynamic-siphon channel reducing the speed of rotation; (iv) transfer of the liquids to the collection channel; (v) transfer of the liquids to a collection chamber; (vi) cooling and transfer of the liquid to the collection chamber; (vii) arrest of the microfluidic disk.

| Step | Starting time [s] | Duration [s] | Freq. [Hz] | Accel. Hz/s] | Temp. [° C.] | Sub-step |
|---|---|---|---|---|---|---|
| Extraction (112) | | 4 | 5-75 | 20 | 35 | (i) acceleration |
| | | 60 | 75 | 0 | 35-50 | (ii) pressure gen. |
| | | 45 | 75-30 | −1 | 50 | (iii) charging |
| | | 60 | 30-0 | −0.5 | 50 | (iv) transfer |
| | | 4 | 0-75 | 20 | 50 | (v) transfer |
| | | 30 | 75 | 0 | 50-30 | (vi) cooling |
| | | 15 | 75-0 | −5 | 30 | (vii) arrest |

From the foregoing, the advantages that the instrument, or apparatus, described herein affords are evident.

The instrument, or apparatus, described enables an accurate control of the internal temperature to be obtained during use, with the microfluidic disk in rotation at medium-to-high frequencies (both with isothermal control and with a temperature ramp).

The optical section further enables good lighting and acquisition of the light radiation emitted, in any case guaranteeing compactness of the instrument.

Modifications and variations may be made to the apparatus described herein, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for rotating and reading a centrifugal microfluidic disk for biological and/or biochemical analyses, comprising:

a container body defining an internal chamber forming a closed curvilinear path, said path including a housing region configured to house said centrifugal microfluidic disk, and a curvilinear channel fluidically coupled to said housing region;

a heater operatively arranged in the curvilinear channel; and a fan operatively arranged in the curvilinear channel.

2. The apparatus according to claim 1, wherein said curvilinear channel includes a first tubular portion, a second tubular portion, and a tubular joining portion fluidly coupling the first and second tubular portions to each other, said first tubular portion being fluidically coupled to a first side of the housing region and said second tubular portion being fluidically coupled to a second side, opposite to the first side, of the housing region, wherein said heater is arranged in the first tubular portion and said fan is arranged in the second tubular portion.

3. The apparatus according to claim 1, further comprising:

a spindle that includes a rotary platform configured to support the centrifugal microfluidic disk; and a motor coupled to the spindle and configured to spin the spindle, including the rotary platform, and thereby spin the centrifugal microfluidic disk, the housing region being configured to house the centrifugal microfluidic disk having a radius comprised between 1 cm and 30 cm.

4. The apparatus according to claim 3, wherein said motor is a bi-directional electric motor of a brushless type.

5. The apparatus according to claim 1, further comprising one or more temperatures sensors housed along the closed curvilinear path.

6. The apparatus according to claim 1, further comprising:

one or more windows for heat exchange between the internal chamber and an environment external to said apparatus; and a controller configured to drive said one or more windows into an open state, enabling said heat exchange, or into a closed state, preventing said heat exchange, for regulating a temperature of said internal chamber according to a biological or biochemical protocol to be implemented.

7. The apparatus according to claim 6, wherein said curvilinear channel includes a first tubular portion, a second tubular portion, and a tubular joining portion fluidly coupling the first and second tubular portions to each other, said first tubular portion being fluidically coupled to a first side of the housing region and said second tubular portion being fluidically coupled to a second side, opposite to the first side, of the housing region, wherein said heater is arranged in the first tubular portion and said fan is arranged in the second tubular portion, the apparatus further comprising:

a port arranged in the tubular joining portion and configured to interrupt a circular flow of air through the path when said one or more windows are driven into an open state, thereby favoring heat exchange between the internal chamber and the environment external to said apparatus.

8. The apparatus according to claim 1, further comprising an optical module that includes:

a first illuminator arranged facing the housing region and at a back side of the container body, opposite to the housing region; and an image-acquisition device arranged facing the housing region and at the back side of the container body, wherein said first illuminator is configured to illuminate first selective regions of said centrifugal microfluidic disk and said image-acquisition device is configured in such a way as to acquire images of said illuminated first selective regions.

9. The apparatus according to claim 8, wherein said first illuminator is configured to emit light radiation with a wavelength comprised between 400 nm and 600 nm and said image-acquisition device is configured to acquire light radiation with a wavelength comprised between 500 nm and 700 nm.

10. The apparatus according to claim 8, further comprising a second illuminator arranged facing the housing region and at the back side of the container body, specularly to a position of the first illuminator.

11. The apparatus according to claim 10, wherein the second illuminator is configured to illuminate second selective regions of said centrifugal microfluidic disk and emit a light radiation at a wavelength different from a wavelength of light radiation emitted by the first illuminator.

12. The apparatus according to claim 8, wherein the image-acquisition device includes a photographic/video camera with CCD or CMOS sensor.

13. The apparatus according to claim 1, further comprising a magnetic actuator that includes a linear step motor and one or more magnets configured to be operatively coupled to said centrifugal microfluidic disk for moving magnetic beads of the centrifugal microfluidic disk during use of said centrifugal microfluidic disk.

14. A system, comprising:

a centrifugal microfluidic disk for biological and/or biochemical analyses; and an apparatus for rotating and reading the centrifugal microfluidic disk, the apparatus including:

a container body defining an internal chamber forming a closed curvilinear path, said path including a housing region configured to house said centrifugal microfluidic disk, and a curvilinear channel fluidically coupled to said housing region;

a heater operatively arranged in the curvilinear channel; and a fan operatively arranged in the curvilinear channel.

15. The system according to claim 14, wherein said curvilinear channel includes a first tubular portion, a second tubular portion, and a tubular joining portion fluidly coupling the first and second tubular portions to each other, said first tubular portion being fluidically coupled to a first side of the housing region and said second tubular portion being fluidically coupled to a second side, opposite to the first side, of the housing region, wherein said heater is arranged in the first tubular portion and said fan is arranged in the second tubular portion.

16. The system according to claim 14, wherein the apparatus also includes:

one or more windows for heat exchange between the internal chamber and an environment external to said apparatus; and a controller configured to drive said one or more windows into an open state, enabling said heat exchange, or into a closed state, preventing said heat exchange, for regulating a temperature of said internal chamber according to a biological or biochemical protocol to be implemented.

17. The system according to claim 16, wherein:

said curvilinear channel includes a first tubular portion, a second tubular portion, and a tubular joining portion fluidly coupling the first and second tubular portions to each other, said first tubular portion being fluidically coupled to a first side of the housing region and said second tubular portion being fluidically coupled to a second side, opposite to the first side, of the housing region;

said heater is arranged in the first tubular portion and said fan is arranged in the second tubular portion; and the apparatus also includes a port arranged in the tubular joining portion and configured to interrupt a circular flow of air through the path when said one or more windows are driven into an open state, thereby favoring heat exchange between the internal chamber and the environment external to said apparatus.

18. The system according to claim 14, wherein the apparatus includes an optical module that includes:

a first illuminator arranged facing the housing region and at a back side of the container body, opposite to the housing region; and an image-acquisition device arranged facing the housing region and at the back side of the container body, wherein said first illuminator is configured to illuminate first selective regions of said centrifugal microfluidic disk and said image-acquisition device is configured in such a way as to acquire images of said illuminated first selective regions.

19. An apparatus for rotating and reading a centrifugal microfluidic disk for biological and/or biochemical analyses, comprising:

a container body defining an internal chamber forming a closed curvilinear path, said path including a housing region configured to house said centrifugal microfluidic disk, and a curvilinear channel fluidically coupled to said housing region;

a heater operatively arranged in the curvilinear channel;

a fan operatively arranged in the curvilinear channel; and an auxiliary reading module that includes an auxiliary heater and an auxiliary optical reader, said auxiliary heater and said auxiliary optical reader being configured to operatively couple to opposite sides of a microfluidic chip of said centrifugal microfluidic disk in order to implement a fluidic protocol of biochemical/biological analyses of wells of the microfluidic chip.

20. The apparatus according to claim 19, further comprising an optical module that includes:

a first illuminator arranged facing the housing region and at a back side of the container body, opposite to the housing region; and an image-acquisition device arranged facing the housing region and at the back side of the container body, wherein said first illuminator is configured to illuminate first selective regions of said centrifugal microfluidic disk and said image-acquisition device is configured in such a way as to acquire images of said illuminated first selective regions.

* * * * *